United States Patent [19]
Appleyard et al.

[11] 3,990,994
[45] Nov. 9, 1976

[54] POLYMERIZATION CATALYST
[75] Inventors: George David Appleyard, Hitchin; Ian Gabriel Williams, Letchworth, both of England
[73] Assignee: Imperial Chemical Industries Limited, London, England
[22] Filed: Jan. 20, 1975
[21] Appl. No.: 542,402

[30] Foreign Application Priority Data
  Jan. 31, 1974  United Kingdom............. 4574/74

[52] U.S. Cl. ............................................. 252/429 B
[51] Int. Cl.² ........................................... B01J 31/02
[58] Field of Search .................. 252/429 B; 26/93.7

[56]         References Cited
          UNITED STATES PATENTS
2,969,345  1/1961  Coover et al. ................. 252/429 B
3,032,510  5/1962  Tornqvist et al. .............. 252/429 C
3,186,977  6/1965  Coover et al. ................. 252/429 B
3,580,899  5/1971  Massoubre ..................... 252/429 B Primary Examiner—J. Poer
Attorney, Agent, or Firm—Cushman, Darby & Cushman

[57]          ABSTRACT

A polymerization catalyst comprises a solid transition metal compound which has been ground with a Lewis Base, an organo-metallic compound of a non-transition metal and a cyclic polyene, preferably with a further quantity of the same, or a different, Lewis Base. The catalyst can be used to polymerize propylene to give a high yield of a polymer having a flexural modulus in excess of 1.00 GN/m².

16 Claims, No Drawings

POLYMERIZATION CATALYST

The present invention relates to catalysts for the polymerization of olefine monemers and the polymerisation of olefine monomers using such catalysts.

The mono-α-olefine monomers can be polymerized using catalysts of the type generally referred to as "Ziegler" catalysts. Using such catalysts, ethylene is polymerised to give a linear polyethylene having different properties from the branched polyethylene which is produced using free radical producing catalysts at high temperatures and pressures. The higher mono-α-olefines, that is those containing at least 3 carbon atoms such as propylene, butene-1 and 4-methylpentene-1, when polymerised using Ziegler catalysts give a mixture of crystalline or isotatic polymer and amorphous or atactic polymer. The commercially desirable material is the isotactic polymer. The Ziegler catalyst systems used commercially to polymerise α-olefines to produce the isotactic polymer have a relatively low polymerization activity and it is necessary to remove catalyst residues from the polymer in order for it to be commercially acceptable. This catalyst removal step adds to the cost of producing the polymer and it is desirable to provide a process wherein it is not necessary to remove the catalyst from the polymer.

According to the present invention there is provided an olefine polymerisation catalyst comprising:
1. at least one solid compound of a transition metal of Groups IVA to VIA of the Periodic Table which has been modified by grinding with a Lewis Base compound;
2. at least one organo-metallic compound of aluminium or a non-transition metal of Groups IA or IIA; and
3. a substituted or unsubstituted polyene.

The catalyst also preferably includes, as a fourth component, a Lewis Base compound which has not been ground with the transition metal compound, and which may be the same as, or different from, the Lewis Base compound which has been ground with the compound of the transition metal.

The transition metal can be, for example, zirconium, vanadium or preferably titanium. It is preferred that the transition metal compound is a halide or oxyhalide, especially a chloride or oxychloride such as $ZrCl_4$, $VCl_3$ or $VOCl_2$. We particularly prefer to use titanium trichloride. The titanium trichloride can be the essentially pure material which is obtained by the reduction of titanium tetrachloride with hydrogen or titanium metal. However, we prefer to use a titanium containing material wherein the titanium trichloride has compounds of other metals, such as aluminium, associated with it and such products can be obtained by reducing titanium tetrachloride with aluminium metal, when the product will also include aluminium chloride, or by reducing titanium tetrachloride with an organo-aluminium compound when the product can also include various organo-aluminium chloride compounds and possibly aluminium chloride depending on the amount and type of the organo-aluminium compound used for the reduction.

Component (2) can be a Grignard reagent which is substantially ether free or a compound of the type $Mg(C_6H_5)_2$. Alternatively component (2) can be a complex of an organo-metallic compound of a non-transition metal of Groups IA or IIA with an organo-aluminium compound, for example $Mg[Al(C_2H_5)_4]_2$ or lithium aluminium tetraalkyl. It is preferred that component (2) is an organo-aluminium compound such as an aluminium hydrocarbyl sulphate, an aluminium hydrocarbyl oxyhydrocarbyl or particularly an aluminium trihydrocarbyl or dihydrocarbyl aluminium halide or hydride, especially aluminium triethyl or diethyl aluminium chloride since catalysts including aluminium triethyl give a high polymerisation rate whilst catalysts including diethyl aluminium chloride give a relatively high percentage yield of the desirable insoluble (isotactic)polymer. A mixture of compounds can be used if desired, for example a mixture of an aluminium trialkyl and an aluminium dialkyl halide. We particularly prefer to use catalysts giving a low level of residual halogen in the polymer product and it is thus desirable to use as component (2) a halogen free compound and in particular an aluminium trihydrocarbyl.

The polyene which is component (3) of the catalyst may be an acyclic polyene such as 3-methylheptatriene(1,4,6) or a cyclic polyene such as cyclooctatriene, cyclooctatetraene or particularly cycloheptatriene or may be a derivative of such cyclic polyenes. Such derivatives can be substituted with alkyl or alkoxy groups as in methylcycloheptatriene, dimethylcyclooctatetraene and methoxycycloheptatriene or may be tropylium salts, tropylium complexes, compounds of the type

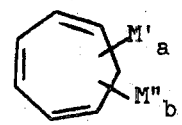

tropolone and its derivatives of the type

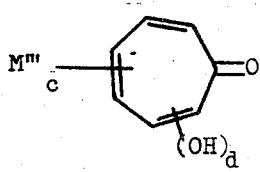 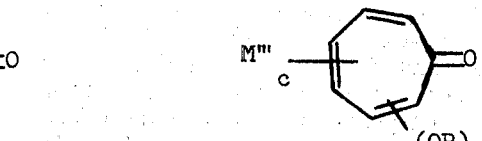

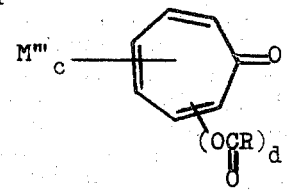

or tropones of the formula

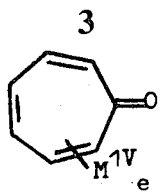

where
- M' is hydrogen, halogen, or a hydrocarbyl group, particularly an alkyl group having 1 to 20 carbon atoms, an aryl group, an aralkyl or alkaryl group wherein the alkyl group has 1 to 20 carbon atoms or a condensed benzene ring having two carbon atoms in common with the cycloheptatriene ring;
- M" is a monovalent group containing at least one of the elements N, S or O;
- M''' is a hydrocarbyl group of 1 to 20 carbon atoms, halogen or M";
- $M^{IV}$ is the same as M' and/or M";
- R is a hydrocarbyl group having 1 to 20 carbon atoms, which may be substituted with an alkoxy- or a hydrocarbylamino-group;
- $a$ and $b$ are integers wherein $a + b \leq 7$ and usually 2 or less, particularly one;
- $c$ and $d$ are integers wherein $c + d \leq 6$; and
- $e$ is an integer wherein $e \leq 6$.

Tropylium salts and tropylium complexes are salts of cycloheptatriene which may be prepared by the process described in Dokl. akad. Nauk, USSR, 113, page 339 (1957). It will be appreciated that there are many derivatives of the cyclic polyenes of the type described including, for example methoxyethyl-tropylether

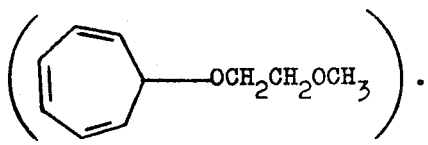

The solid compound of a transition metal is modified by grinding with a Lewis Base compound and the catalyst also preferably includes a Lewis Base compound as a fourth component. The Lewis Base used either for modifying the solid transition metal compound or as a component (4) of the catalyst can be any Lewis Base which is effective to alter the activity and/or stereospecificity of a Ziegler catalyst system. A wide range of such Lewis Bases which been proposed which have such an effect and these include amines, such as diethylamine or tributylamine; cyclic amines such as pyridine, quinoline, isoquinoline and alkyl substituted derivatives thereof; diamines such as N,N,N',N'-tetramethylethylenediamine; alkanolamines such as N,N-dimethylethanolamine; amides; urea and thiourea and the substituted derivatives thereof such as N,N,N',N'-tetramethylurea; organophosphorus compounds including the phosphites, phosphates, phosphines and phosphine oxides, such as triphenyl phosphine oxide, bis(dimethylamino)ethoxyphosphine oxide and hexamethylphosphoric triamide; ethers; esters; ketones; alcohols; the sulphur containing analogues of the ethers, esters, ketones and alcohols and silicon compounds such as the silanes and siloxanes. It will be appreciated that the effect of, and the optimum conditions for using, a Lewis Base will depend on the particular Lewis Base selected. Catalyst systems including Lewis Base compounds or complexes including Lewis Base compounds are disclosed, inter alia, in British Patent Specification Nos. 803,198; 809,717; 880,998; 896,509; 920,118; 921,954; 933,236; 940,125; 966,025; 969,074; 971,248; 1,013,363; 1,049,723; 1,112,010; 1,150,845 and 1,208,815; Dutch Patent Application No. 70 15555 and German Patent Application No. 2,130,314. Of the Lewis Bases of the type described which can be used in the catalyst of the present invention, we prefer that the transition metal compound has been ground with an organo-phosphorus compound, particularly a phosphine oxide derivative such as hexamethylphosphoric triamide. We prefer that the Lewis Base used as component (4) is either an organo-phosphorus compound or an amine, which is particularly a diamine.

Other Lewis Bases which may very conveniently be used are organo-phosphorus compounds selected from materials of the formulae:

a. $T_{3-n}P(Q)_a(E-Z-G)_n$;

b. 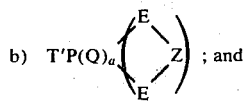 ; and c. $T''_2P(Q)_aXP(Q)_aT''_2$ wherein
- each T is independently halogen, a hydrocarbyl group, a group $-NR'_2$ or $OR'$, or a heterocyclic group;
- T' is T or a group (E—Z—G);
- T" is T', or both the T" groups which are attached to the same P atom together to form a group

R' is a hydrocarbyl group;

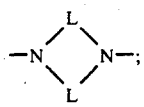

- R" is a hydrogen or R';
- L is a bivalent hydrocarbyl radical and each L may be the same or different;
- each E is —O—, —S— or —NR'— and may be the same or different;
- G is —OR', —SR', —NR'$_2$, —PR'$_2$ or a heterocyclic ring system whereof the heteroatom is O, S, N or P;
- Q is an oxygen or sulphur atom;
- Z is a bivalent hydrocarbyl radical such that E and G, or E and E are separated by not more than 3 carbon atoms;
- each $a$ is independently zero or 1;
- $m$ is a positive integer, and
- $n$ is 1, 2 or 3.

In the phosphorus compounds of the type (a), (b) and (c), the groups T and T" attached to a given phosphorus atom are conveniently the same. In compound (c) it is particularly convenient if all the groups T" are the same. The groups T, T' and T" can be alkylamino groups —NR'$_2$ wherein R' is an alkyl group such as methyl or ethyl. Alternatively, the groups T, T' and T'' may be heterocyclic groups such as pyridyl, pyrrolyl, pyrrolidyl or piperidyl and may be attached to the phosphorus atom through a carbon or nitrogen atom. If T' or T'' is a group (E—Z—G), this can be a group derived from, for example an hydroxy ether; an N, N-substituted alkanolamine, an N,N,N'-substituted diamine or an N,N-substituted aminothiol group and G can be derived from a heterocyclic compound such as pyridine, quinoline, isoquinoline, etc. If both of the groups T'' attached to the same phosphorus atom together form a group

this can be the divalent residue from a glycol, an N-substituted aminoalcohol, an N,N'-substituted diamine or an N-substituted aminothiol. In compounds (a) and (b) it is preferred that a is one and the group Q is oxygen. Conveniently, but not necessarily, in compounds (c) the value of each a is the same, that is both are either zero or preferably one, and similarly it is preferred that both of the groups Q are the same and are oxygen.

In compound (b), it is preferred that at least one of the groups E is —NR'—. If a is zero, that is when the phosphorus is trivalent it is preferred that group T' is (E—Z—G).

In compound (c), the group X can be derived from a monoamine or an acyclic or cyclic diamine. If the group X is of the type —NR'(CH$_2$)$_m$NR'—, the group R' is preferably a hydrocarbyl group such as methyl and m is preferably 2 or 3. If the group X is of the type

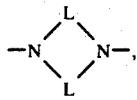

it is preferred that the groups L are both the same and are alkylene groups of the type —(CH$_2$)$_m$—, particularly ethylene groups when X is derived from piperazine. We have obtained satisfactory polymerisation systems using as the phosphorus compound (c), materials in which the group X is

—N(CH$_3$)CH$_2$CH$_2$N(CH$_3$)—;

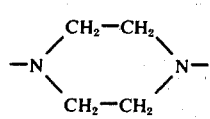

or particularly —O—.

In compound (c) when each a is zero it is preferred either that X is derived from an acyclic or cyclic diamine or that at least one T'' is a group (E—Z—G).

Phosphorus compounds of the type (a), (b) and (c) which may be used as the Lewis Base include compounds of the formulae I to XXVIII.

[(CH$_3$)$_2$N]$_2$P(O)N(CH$_3$)CH$_2$CH$_2$N(CH$_3$)$_2$     I (CH$_3$)$_2$NP(O)[N(CH$_3$) CH$_2$CH$_2$N(CH$_3$)$_2$]$_2$     II

[(CH$_3$)$_2$N]$_2$P(O)OCH$_2$CH$_2$N(CH$_3$)$_2$     III (CH$_3$)$_2$NP(O)[OCH$_2$CH$_2$N(CH$_3$)$_2$]$_2$     IV

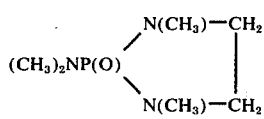   V

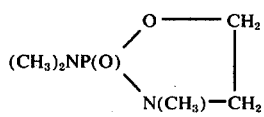   VI

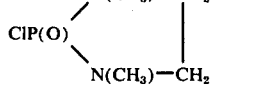   VII

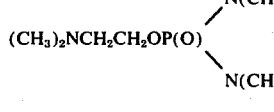   VIII

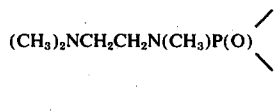   IX

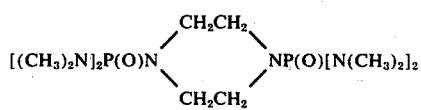   X

[(CH$_3$)$_2$N]$_2$P(O)N(CH$_3$)CH$_2$CH$_2$N(CH$_3$)-P(O)[N(CH$_3$)$_2$]$_2$     XI

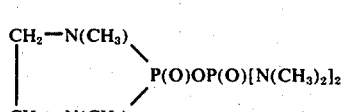   XII

[(CH$_3$)$_2$N]$_2$P(O)OP(O)[N(CH$_3$)$_2$]$_2$     XIII

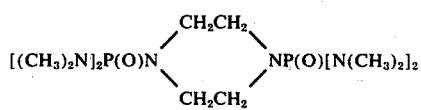   XIV

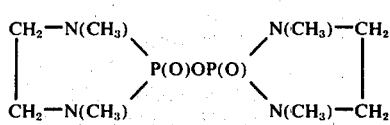   XV

[(CH$_3$)$_2$N]$_2$P(O)OP(O)(OC$_2$H$_5$)$_2$     XVI

[(C$_2$H$_5$)$_2$N]$_2$P(O)OP(O)[N(CH$_3$)$_2$]$_2$     XVII

[(CH$_3$)$_2$N]$_2$P(S)OP(O)[N(CH$_3$)$_2$]$_2$     XVIII

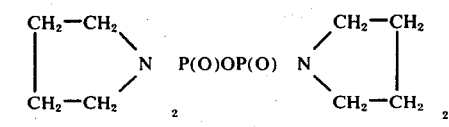  XIX

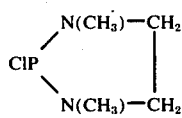  XX

P[OCH$_2$CH$_2$N(CH$_3$)$_2$]$_3$  XXI

P[N(CH$_3$)$_2$][OCH$_2$CH$_2$N(CH$_3$)$_2$]$_2$  XXII

P[N(CH$_3$)$_2$]$_2$[OCH$_2$CH$_2$N(CH$_3$)$_2$]  XXIII

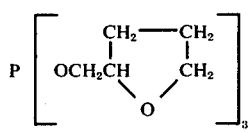  XXIV

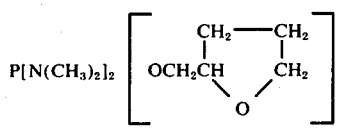  XXV

P[OCH$_2$CH$_2$OCH$_3$]$_3$  XXVI

P[OC$_2$H$_5$][OCH$_2$CH$_2$OCH$_3$]$_3$  XXVII

P[N(CH$_3$)$_2$]$_2$[N(CH$_3$)CH$_2$CH$_2$N(CH$_3$)$_2$]  XXVIII

It is preferred to use compounds of the formulae I to XIX, for example those of Formulae I, V and XIII.

Other Lewis Bases which may be used include organophosphine oxide derivatives wherein at least one group attached to the phosphorus atom is a heterocyclic group containing more than 3 atoms preferably five or six atoms, in the ring and attached to the phosphorus atom by a carbon or heteroatom as described in our copending British Patent Application No. 7989/73. Alternatively the Lewis Base may be an organo-phosphine oxide wherein the phosphorus atom is included, together with three other heteroatoms, in an endocyclic ring system as described in our copending British Patent Application No. 7988/73.

In forming component (1) of the catalyst system, the molar proportion of the Lewis Base which is ground with the solid transition metal compound should be less than the molar proportion of the transition metal compound. Preferably from 0.01 up to 0.5, especially 0.05 up to 0.33 molar proportions of Lewis Base are ground with each molar proportion of the solid compound of the transition metal. The optimum quantity of any particular Lewis Base will be dependent on the Lewis Base. The grinding process is preferably a ball milling which is carried out in the dry state, that is without additional liquid diluents. For the ball-milling the materials to be milled may be introduced into the ball-mill either neat or as a slurry or solution in a suitable inert diluent, which can then be removed either by reducing the pressure, increasing the temperature or both. The milling can be effected at any suitable temperature and is conveniently effected at ambient temperature (about 20°–25° C) or at a slightly elevated temperature such as 60° C, although lower or higher temperatures can be used if desired. The milling time should be sufficient to give a catalyst system having the desired characteristics and may be between 10 and 100 hours, for example from 24 up to 65 hours, although shorter or longer milling times can be used if necessary. The milling time required will be dependent on the intensity of the milling which is affected by the characteristics of the mill, including the balls used, and, when using a rotating ball mill, the rate of rotation of the mill.

The proportions of the catalyst can vary quite widely depending on the particular materials used and the absolute concentrations of the components. However, in general for each molecular proportion of the transition metal compound present in component (1) of the catalyst there is present from 0.05 up to 20, preferably 1 to 20 molecular proportions of component (2). The molar proportion of the polyene, plus any additional Lewis Base compound present as component (4) of the catalyst system, should preferably, in total be less than the number of moles of component (2) which is present in the catalyst. For each mole of component (2), the number of moles of the polyene is conveniently in the range from 0.01 up to 1.0, especially 0.05 up to 0.5, for example from 0.1 up to 0.2.

If the catalyst includes further Lewis Base as component (4) of the catalyst then for each molecular proportion of the transition metal compound present in component (1), there is present from 0.01 up to 10, preferably from 0.1 up to 4 molecular proportions of the Lewis Base which is component (4) and the amount of component (4) is less than the amount of component (2). Components (3) and (4) of the catalysts can conveniently be used in equimolecular proportions but the relative proportions of these components may be varied to give the optimum results.

A preferred catalyst within the present invention comprises:

1. a modified titanium trichloride-containing material which has been obtained by ball milling a titanium trichloride with a Lewis Base compound;
2. from 0.1 up to 20 molecular proportions, for each molecular proportion of titanium trichloride, of a halogen free organo-aluminium compound particularly an aluminium trihydrocarbyl;
3. from 0.01 up to 1.0 molecular proportions for each molecular proportion of component (2) of a cyclic polyene which is cyclooctatriene, cyclooctatetraene or cycloheptatriene or substituted derivatives thereof;
4. from 0.01 up to 10 molecular proportions, for each molecular proportion of titanium trichloride, of a Lewis Base which may be the same as, or different from, the Lewis Base ball milled with the titanium trichloride, wherein the total amount of moles of components (3) and (4) is less than the amount of component (2).

The catalysts of the present invention are particularly suitable for the polymerisation and copolymerisation of mono-α-olefines.

Thus according to a further aspect of the present invention at least one mono-α-olefine is contacted with a polymerisation catalyst comprising:

1. at least one solid component of a transition metal of Groups IVA to VIA which has been modified by grinding with a Lewis Base compound;
2. at least one organo-metallic compound of aluminium or a non-transition metal of Groups IA to IIA;

3. a substituted or unsubstituted polyene; and optionally
4. a further quantity of a Lewis Base compound which may be the same as, or different from, the Lewis Base compound ground with the solid transition metal compound.

Any mono-α-olefine monomer which is capable of being polymerised using a Ziegler catalyst may be polymerised by the process of the present invention. Thus, monomers which can be polymerised by the present process include butene-1, and 4-methylpentene-1 and particularly propylene. These olefines may be copolymerised together but we prefer to effect copolymerisation with ethylene, conveniently using a sequential polymerisation process such as described in British Pat. Nos. 970,478; 970,479 and 1,014,944.

We have found that the process of the present invention can be used for the polymerisation of propylene to give a high yield of polymer relative to the amount of catalyst used and also a relatively low proportion of the undesirable soluble polymer.

It is well known that catalysts of the "Ziegler" type are susceptible to the effects of impurities and the activity and stereospecificity of such catalysts can be effected in a detrimental manner by the presence of small quantities of impurities, particularly oxygen and polar compounds such as water and alcohol in the monomer and/or diluent when used. Thus, for the polymerisation of olefine monomers using Ziegler catalysts, it is known to use pure monomers and diluents. However, when using catalysts in accordance with the present invention, these can be used in smaller proportions than the conventional Ziegler type catalyst and accordingly are more susceptible to any impurites present in the system. Thus, for use with the catalyst of the present invention, it is desirable that the monomers, and any diluents, if they are of commercial purity, are subjected to a further purification procedure.

Any suitable purification treatment can be used and the treatment can be effected in more than one stage if desired. The particular purification treatment used will be dependent on the purity of the starting materials.

Satisfactory purity can be achieved in most cases by passing the monomer (and diluent, if used) through a bed of a material which is capable of absorbing the impurities contained in the monomer or diluent, for example as described in British Patent specification Nos. 1,111,493 and 1,226,659.

Using catalysts in accordance with the present invention, polymerisation can be carried out in the presence of absence of an inert diluent such as a suitably purified paraffinic hydrocarbon. If a diluent is not used, polymerisation can be effected in the liquid phase using excess liquid monomer as the suspension medium for catalyst and polymer product. If the monomer is used in the gaseous phase, polymerisation can be effected using any technique suitable for effecting a gas/solid reaction such as a fluidised bed reactor system or a ribbon blender type of reactor.

Polymerisation may be effected either in a batch manner or on a continuous basis. The catalyst components may be introduced into the polymerisation vessel separately but it may be preferred, particularly if polymerisation is being effected on a continuous basis, to mix all the catalyst components together before they are introduced into the polymerisation reactor. Alternatively, in a batch process, not all of the catalyst is added at the beginning of the polymerisation. Thus, a proportion of the catalyst may be added to initiate polymerisation and further quantities of one or more of the catalyst components are added at one or more times during the polymerisation. Conveniently at least 25% of each catalyst component is added to initiate polymerisation, the remaining catalyst components being added during the polymerisation. Since feeding a slurry of the solid compound of the transition metal may be inconvenient, it may be preferred that all of the transition metal compound is added, together with some of each of the other catalyst components, to initiate polymerisation and the rest of the other catalyst components are added during the polymerisation. It is desirable that in any mixing of the catalyst components the transition metal compound is not allowed to come into contact with the Lewis Base compound which is component (4) in the absence of the organo-metallic compound which is component (2) of the catalyst.

The polymerisation can be effected in the presence of a chain transfer agent such as hydrogen or a zinc dialkyl, in order to control the molecular weight of the product formed.

Using catalysts in accordance with the present invention, particularly catalysts wherein the Lewis Base is a phosphorus compound and which also include further Lewis Base as component (4) of the catalyst, we have been able to polymerise propylene to obtain a high yield, relative to the amount of catalyst used, of a polymer having a high flexural modulus which in some cases may be as high as that of commercially available propylene polymers which have been obtained in a lower yield and from which a catalyst removal step is necessary.

Thus, when using catalyst containing titanium trichloride, a propylene polymer can be obtained wherein the titanium contents of the polymer derived from the residual catalyst in the polymer is not more than about 80 parts per million (ppm) by weight and the flexural modulus of the polymer is at least 1.00 $GN/m^2$, said polymer being the direct product of polymerisation. The chlorine content of such a polymer can be less than 250 ppm by weight, preferably less than 200 ppm by weight.

The flexural modulus of the polymer is the modulus as measured by the apparatus described in Polymer Age, March 1970, pages 57 and 58 at 1% skin strain after 60 seconds at 23° C and 50% relative humidity using test samples prepared as described in the Examples.

The titanium and chlorine content of the polymer may be determined by any suitable analytical technique and we have found X-ray fluorescence spectrometry to be a particularly convenient technique of analysis.

In general, polymers in accordance with the present invention, particularly propylene homopolymers, when formed into test strips, have a flexural modulus in excess of 1.10 $GN/m^2$, usually at least 1.15 $GN/m^2$. Preferred polymers have a flexural modulus of at least 1.20 $GN/m^2$ and the flexural modulus may be as high as 1.35 $GN/m^2$. Thus propylene homopolymers in accordance with the present invention have a flexural modulus in the range from 1.00 up to 1.40 or higher, $GN/m^2$.

Propylene polymers in accordance with the present invention are the direct product of polymerisation and are obtained without subjecting the polymer to any treatment to remove either catalyst residue or undesirable polymeric materials such as atactic polymers, polymers of low crystallinity or crystalline polymers of low molecular weight, from the polymerisation product. Whilst the polymers of the present invention are obtained without an extraction process, the flexural modulus can be increased by extraction with a suitable solvent. Whilst it is possible to use a high boiling aliphatic hydrocarbon such as heptane for such an extraction, we have found that extraction with low boiling solvents which extract only a small proportion, typically between 2 and 4% by weight of the polymer, can produce a significant increase in the modulus of the polymer.

Polymers in accordance with the present invention have a high molecular weight as indicated by the melt flow index measured according to ASTM Test Method D 1238-70, using Condition N (that is a temperature of 190° C and a weight of 10 kgm). Polymers in accordance with the present invention have a melt flow index of less than 200. Preferred polymers have a melt flow index of less than 100, particularly less than 50, for example between 5 and 50.

Various aspects of the present invention will now be described with reference to the following examples which are illustrative of the invention.

EXAMPLES 1 to 7

The transition metal compound was a commercially available form of titanium trichloride manufactured by Toho Titanium Company of Japan and identified as TAC 191 (this material is believed to be obtained by the reduction of $TiCl_4$ with aluminium metal and thereafter milling the dry powder, the formula of the product being approximately $TiCl_3.\frac{1}{3}\,AlCl_3$).

The TAC 191 was modified by grinding with hexamethylphosphoric triamide (HMPT).

The mill used was a stainless steel mill of 13 cm diameter and 23 cm long provided with six pairs of wire baffles. The mill contained about 700 stainless steel balls of 1.27 cms in diameter. The mill was evacuated to vacuum and purged with nitrogen, this procedure being effected a total of six times. 131 gm of TAC 191 was added to the mill as a solid, and the mill was rotated for 10 minutes at 60 rpm. Whilst the mill was rotating, 19.6 gm of hexamethylphosphoric triamide was added from a syringe over a period of 4 to 5 minutes. Milling was then continued for 24 hours at 60 rpm. The molar ratio of $TiCl_3$:HMPT in the milled product was found by phosphorus and titanium analysis to be 5.6:1.

Propylene to be used for the polymerisation was purified by passing gaseous propylene in turn through a column (3 inches diameter, 3 feet length) containing one-sixteenth inch granules of Alcoa F1 alumina at 50°–60° C, and then through a similar column containing BTS catalyst (Cupric oxide reduced to finely divided metallic copper on a magnesium oxide support) at 40°–50° C, condensing the issuing gas and passing the liquid propylene through four columns (all 3 inches diameter; two of 3 feet in length, two of 6 feet in length) at 25° C, each containing one-sixteenth inch pellets of Union Carbide 3A molecular sieves.

This treatment reduced the water content of the monomer from 5–10 ppm by volume to <1 ppm by volume and the oxygen content from 1–2 ppm by volume to <0.5 ppm by volume. The level of inert compounds (nitrogen, ethane, etc.) was unchanged at 0.3% and the level of unsaturated hydrocarbons (allene, methylacetylene, etc) was unchanged at <1 ppm.

Polymerisation was carried out in a stainless steel autoclave, of total capacity 8 liters, which was fitted with a vertical anchor stirrer. The autoclave was heated to 70° C, evacuated and the vacuum was released with propylene. The autoclave was then evacuated again and the procedure repeated 5 times. A solution of aluminium triethyl (8 gm millimoles) in n-heptane (6.5 ml) was mixed with 1,3,5-cycloheptatriene and a Lewis Base (when used). When the Lewis Base was octamethylpyrophosphoramide, benzene (0.8 ml) was also added to dissolve the Lewis Base. This mixture was injected into the above-described autoclave containing propylene gas at 35° C and 2 psi gauge. One gram millimole of titanium trichloride as a suspension in dry n-heptane of the titanium trichloride milled as described above, was injected into the autoclave and then, within 5–10 seconds, 5 liters of liquid propylene were added, the stirrer being operated at 150 rpm. This propylene addition was effected by allowing 5.5 liters of liquid propylene to transfer frm a burette at 50° C to the autoclave. Hydrogen (200 gram millimoles) was added and the temperature of the autoclave contents was raised to 65° C over 10 minutes. The hydrogen was commercially available hydrogen (99.99% pure) which had been further purified by passing through a column (8 inches by 4 feet in length) containing a molecular sieve material (Union Carbide 3A) at 20° C. The hydrogen was stored in the sieve column and drawn off as required. Polymerisation was allowed to proceed at a temperature of 65° C and a pressure of 410 psi gauge. More hydrogen (20 gram millimoles on each occasion) was added after 10, 25, 45, 80 and 120 minutes from the time of the first hydrogen addition. After a period of polymerisation the autoclave was vented over a period of 10 minutes to remove unpolymerised propylene, and a free-flowing, grey powder was obtained. The polymerisation conditions are set out in Table 1. In all examples the catalyst contained 1 gm millimole of $TiCl_3$ and 8 gm millimoles of aluminium triethyl.

TABLE 1

| Example or Comparative Example | Lewis Base Added Type (a) | mM | Amount polyene (mM) | Polymerisation Time (hours) | Conversion (g/mM of $TiCl_3$) |
|---|---|---|---|---|---|
| 1 | DDDPO | 0.8 | 0.8 | 2½ | 660 |
| 2 | OMPA | 0.8 | 0.8 | 2½ | 670 |
| 3 | PDEPT | 0.8 | 0.8 | 2½ | 780 |
| 4 | HMPT | 0.8 | 0.8 | 2½ | 810 |
| 5 | — | NIL | 0.8 | 2½ | 870 |
| 6 | TMED | 0.4 | 0.8 | 2½ | 825 |
| 7 | TMED | 0.8 | 0.8 | 2½ | 1060 |
| A | — | NIL | NIL | 2½ | 1550 |
| B* | OMPA | 0.8 | 0.8 | 2½ | 390 |

TABLE 1-continued

| Example or Comparative Example | Lewis Base Added Type (a) | Amount mM | Amount polyene (mM) | Polymerisation Time (hours) | Conversion (g/mM of TiCl₃) |
| --- | --- | --- | --- | --- | --- |
| C | HMPT | 0.8 | NIL | 2½ | 1470 |

(a) DDDPO is 2-dimethylamino-1,3-dimethyl-1,3-diaza-2-phospholidine-2-oxide (Formula V)
OMPA is octamethylpyrophosphoramide (Formula XIII)
PDEPT is N,N,N',N',N''-pentamethyl-N''-β-dimethylamino-ethylphosphoric triamide (Formula I)
HMPT is hexamethylphosphoric triamide
TMED is N,N,N',N'-tetramethylethylenediamine
(b) Based on yield of polymer and quantity of TiCl₃ nominally used
*In Comparative example B the titanium trichloride used was TAC 191 as supplied The properties of the polymers obtained were then determined. The flexural modulus was measured using a cantilever beam apparatus as described in Polymer Age, March 1970, pages 57 and 58. The deformation of a test strip at 1% skin strain after 60 seconds at 23° C and 50% relative humidity was measured. The test strip which had dimensions of approximately 150 × 19 × 1.6 mm was prepared by mixing 23 g of the polymer with 0.1% by weight of an antioxidant ('Topanol' CA), and adding the mixture to a Brabender Plasticiser, at 190° C, 30 rpm and under a load of 10 kg to convert it to a crepe. The crepe was placed within a template, between aluminium foil and pressed by means of an electric Tangye Press at a temperature of 250° C. The pressing was pre-heated for a period of 6 minutes, under just enough pressure to make the polymer flow across the template, that is an applied force about 1 ton per square inch. After the preheat period, the applied force was raised to 15 tons in 5 ton increments, de-gassing (that is releasing pressure) every 5 tons. After 2 minutes at 15 tons, the press was cooled by means of air and water for 10 minutes or until room temperature was reached.

The plaque was then cut into strips of dimensions 150 × 19 × 1.6 mm. Duplicate strips of each polymer were placed into an annealing oven at 130° C, and after 2 hours at this temperature the heat was switched off and the oven cooled to ambient temperature at an initial rate of 15° C per hour.

The melt flow index was measured by ASTM Test Method D 1238-70, Condition N (190° C and 10 kgm). The fraction of polymer soluble in boiling heptane was determined by Soxhlet extraction for 16 hours using about 150 mls of heptane and 5 gms of polymer. The Ti contents of the polymers were calculated from the yield of polymer relative to catalyst and also were determined experimentally by X-ray fluorescence spectrometry using incident X-rays obtained from a chrome anode.

The results obtained are set out in Table 2.

TABLE 2

| Example or Comparative Example | Ti(ppm) Calc | Ti(ppm) Found | Cl(ppm Calc (c) | % Wt Hot Heptane Soluble Polymer (d) | Flex Modulus (GN/m²) (e) | MFI (f) | Flex Modulus corrected to MFI=20(GN/m²) (g) |
| --- | --- | --- | --- | --- | --- | --- | --- |
| 1 | 73 | 75 | 225 | 7.2 | 1.18 | 8 | 1.25 |
| 2 | 72 | 76 | 228 | 6.8 | 1.35 | 27 | 1.33 |
| 3 | 61 | 69 | 207 | 6.9 | 1.10 | 14 | 1.13 |
| 4 | 59 | 50 | 150 | 15.5 | 0.99 | 16 | 1.01 |
| 5 | 55 | 49 | 147 | 12.9 | 1.04 | 9 | 1.10 |
| 6 | 65 | 70 | 210 | 7.2 | 1.33 | 22.5 | 1.32 |
| 7 | 45 | 70 | 210 | 5.8 | 1.29 | 4.8 | 1.40 |
| A | 31 | 32 | 96 | 24.2 | 0.70 | 25 | 0.68 |
| B | 123 | 134 | 402 | 16.0 | 1.06 | 55 | 0.98 |
| C | 33 | 40 | 120 | 17.9 | 0.67 | 5.1 | 0.78 |

(c) 3 times the amount of Ti found
(d) Measured by Soxhlet extraction with boiling heptane for 16 hours
(e) Measured as indicated using the apparatus described in Polymer Age, March 1970, Pages 57 and 58.
(f) Measured according to ASTM Test Method D 1238-70 Condition N
(g) Flexural Modulus is dependent on MFI and strict comparison is possible only at the same MFI. All the measured Flexural Moduli were corrected to a calculated value at MFI = 20 by applying a correction factor of 0.18 GN/m² for each rise in MFI by a factor of 10 (that is from 3 to 30 or 6.7 to 67 etc.)

EXAMPLES 8 TO 11

The polymerisation process of Examples 1 to 7 was repeated using different catalyst systems which were changed in one or more of the following respects, namely the type of titanium trichloride, the milling technique, the Lewis Base used in the milling, the amount of Lewis Base used in the milling, the Lewis Base used as the fourth component and the relative amounts of the various components. The details of the catalyst systems used are set out in Table 3.

TABLE 3

| | Milling Step | | | | | | Polymerisation Step | | | | |
| --- | --- | --- | --- | --- | --- | --- | --- | --- | --- | --- | --- |
| | TiCl₃ | | Type of Mill (i) | Lewis Base | | Milling Time (hours) | Procedure (j) | Amount TiCl₃ (mMoles) | Lewis Base | | CHT (k) Amount (mMoles) |
| Example No. | Type (h) | Amount (gm) | | Type (a) | Amount (Moles/Mole TiCl₃) | | | | Type (a) | Amount (mMoles) | |
| 8 | 141 | 27 | α | PDEPT | 0.11 | 24 | I | 1.0 | TMED | 0.8 | 0.8 |
| 9 | AA | 190 | β | HMPT | 0.167 | 66 | II | 1.0 | TMED | 0.8 | 0.8 |
| 10 | AA | 141 | β | HMPT | 0.11 | 64 | III | 1.0 | TMED | 0.8 | 0.8 |

TABLE 3-continued

| | Milling Step | | | | | | | Polymerisation Step | | | |
|---|---|---|---|---|---|---|---|---|---|---|---|
| | TiCl₃ | | Type of Mill (i) | Lewis Base | | Milling Time (hours) | Procedure (j) | Amount TiCl₃ (mMoles) | Lewis Base | | CHT (k) Amount (mMoles) |
| Example No. | Type (h) | Amount (gm) | | Type (a) | Amount (Moles/Mole TiCl₃) | | | | Type (a) | Amount (mMoles) | |
| 11 | 191 | 21 | α | PEDPT | 0.11 | 64 | I | 1.0 | TMED | 0.8 | 0.8 |

Notes to Table 3
(a) As defined in Table 1.
(h) AA is TiCl₃-AA sold by the Stauffer Chemical Company. 141 is TAC-141 sold by Toho Titanium Company. 191 is TAC-191.
(i) α refers to a stainless steel ball mill 15.2 cm long and 7.9 cm diameter fitted with four lifters and containing 200 stainless steel balls of 1.27 cm diameter and 200 stainless steel balls of 0.64 cm diameter. β refers to a stainless steel ball mill, 14.0 cm long and 12.7 cm diameter fitted with four lifters and containing 100 stainless steel balls of 1.27 cm diameter and 100 stainless steel balls of 1.91 cm diameter.
(j) I The titanium trichloride was suspended in pentane in a flask and the required quantity of the Lewis Base was added. The flask was agitated and then evacuated to remove the pentane. The dry solid residue was transferred to the mill, which had previously been purged with nitrogen. The mill was then rotated at 120 rpm. II The titanium trichloride was introduced into the mill, which had previously been purged with nitrogen. The mill was rotated for one hour at 60 rpm and then, whilst the mill was still rotating 9 mls of neat Lewis Base were introduced into the mill over a period of about 5 minutes. The mill was rotated for a further 24 hours and a further 9 mls of Lewis Base were added. The mill was rotated for 19 hours more and 9.9 mls of the Lewis Base were added. The mill was then rotated for a further 22 hours to give a total milling time of 66 hours. III The titanium trichloride was introduced into the mill and all of the Lewis Base was added. The mill was rotated at 60 rpm. All the millings were carried out without heating or cooling of the mills.
(k) CHT is 1,3,5-cycloheptatriene. The results obtained in the polymerisations are set out in Table 4.

TABLE 4

| Ex. No. | Ti found (ppm) | Residual Soluble Polymer (% by wt) (l) | Flex Modulus (GN/m²) (e) | MFI (f) | Flex Modulus corrected to MFI = 20 (GN/m²) (g) |
|---|---|---|---|---|---|
| 8 | 82 | 8.2 | 1.22 | 13.0 | 1.25 |
| 9 | 76 | 8.0 | 1.23 | 10.0 | 1.29 |
| 10 | 69 | 8.2 | 1.19 | 5.4 | 1.29 |
| 11 | 70 | 6.5 | 1.14 | 6.0 | 1.24 |

Notes to Table 4
(e) (f) and (g) as defined in Table 2.
(l) The proportion of residual soluble polymer was determined by adding 1 gram of solid polymer to 50 ml of an inert aliphatic hydrocarbon diluent (mainly C₁₂ isomers) having a boiling point range of about 170 to 180° C, and heating the mixture to 185° C and maintaining this temperature until the polymer had fully dissolved. The solution was cooled to 60° C and maintained at this temperature, with stirring, for 18 hours. The precipitated polymer was separated by filtration at 60° C and the proportion of polymer which remained dissolved in the hydrocarbon diluent determined by evaporating the solution to dryness.

EXAMPLE 12

An autoclave of the type described in the preceding Examples was evacuated and purged as described in the preceding Examples. One liter of heptane was added to the autoclave which contained propylene gas at 35° C and 2 psi gauge. There was then added a solution in heptane containing 12 gm millimoles of diethyl aluminium monochloride, and this was followed by a solution in heptane of 4 gm millimoles of hexamethylphosphoric triamide. A suspension, in heptane, of 2 gm millimoles of the milled titanium trichloride described for Example 9 was then added. The autoclave was heated to 60° C and maintained at that temperature for half an hour. A solution containing 8 gm millimoles of aluminium triethyl, 0.8 gm millimoles of N,N,N',N'-tetramethylethylenediamine and 0.8 gm millimoles of 1,3,5-cycloheptatriene was then added and the autoclave was cooled to 35° C. 5 liters of liquid propylene were added, and 200 gm millimoles of hydrogen were added 5 minutes later and at the same time heating was applied and the autoclave attained 60° C in 10 minutes. Five further addition of hydrogen were made (20 gm millimoles for each addition), 10, 25, 45, 80 and 120 minutes after the first (200 gm millimoles) addition of hydrogen. Polymerisation was continued for a total of 4.5 hours and the reactor was then vented and the solid polymer recovered. The polymer obtained had the following properties:

| Ti found | 95 ppm |
|---|---|
| Residual soluble polymer (l) | 7.0 wt % |
| Flex. Modulus (e) | 1.33 GN/m² |
| MFI (f) | 41.0 |
| Flex. Modulus corrected to MFI=20 (g) | 1.27 GN/m² |

(e), (f) and (g) - as defined in Table 2
(l) - as defined in Table 4.

EXAMPLE 13

The titanium trichloride material used in Example 1 to 7 was used to polymerise propylene in the gas phase. Polymerisation was carried out in a steel autoclave of capacity 8 liters fitted with an anchor stirrer/scraper. 400 g of dry polypropylene was added while stirring the autoclave at 70° C. The stirrer speed was 150 rpm. The autoclave was evacuated, after half an hour the vacuum was released with propylene, and then the autoclave was re-evacuated. This procedure was repeated a further five times over an hour and a half to leave an atmosphere of propylene. The stirrer was stopped and a solution, in heptane, of 12 gramm millimoles of aluminium triethyl, 2.4 gm millimoles of hexamethylphosphoric triamide and 2.4 gm millimoles of 1,3,5-cycloheptatriene was added with the stirrer stopped. The autoclave was stirred for a further minute, the stirrer stopped and 2 gram millimoles of the titanium trichloride material were added. The stirrer was restarted and propylene gas was then admitted to the top of the autoclave from a heated stock vessel containing liquid propylene. A pressure of 400 psi gauge was established over a period of about 30 minutes. The temperature was maintained at 70° C throughout. Hydrogen was added evenly during the pressurisation stage at a rate of 20 mM per 100 psig pressure rise. Polymerisation was effected at 400 psig nd 70° C, and hydrogen was added in aliquots of 10 mM for every 80 g of liquid propylene evaporated into the autoclave from the stock vessel. After 5 hours polymerisation the propylene supply was switched off, and the autoclave vented to atmospheric pressure. The gas cap was purged with nitrogen and the polymer emptied out. The polymer obtained was a free flowing greyish powder. The polymer initially present in the reactor had the following characteristics:

| | |
|---|---|
| Ti content | 28 ppm |
| Hot Heptane soluble Polymer (d) | 4.3 % wt |
| MFI (f) | 23 |
| Flex Mod (e) | 1.39 GNm$^{-2}$ |

The product obtained from the autoclave, which included the polymer initially present in the autoclave, had the following characteristics:

| | |
|---|---|
| Ti found | 89 ppm |
| Residual soluble polymer (1) | 5.9% wt |
| Flex Modulus (e) | 1.37 GN/m$^2$ |
| MFI (f) | 15.5 |
| Flex Modulus corrected to MFI=20 (g) | 1.39 GN/m$^2$ |

(d), (e), (f) and (g) - as defined in Table 2
(1) - as defined in Table 4

We claim:
1. An olefine polymerisation catalyst comprising
   1. at least one solid halide or oxyhalide of a transition metal of Groups IVA to VIA of the Periodic Table, which has been modified by grinding with an organo-phosphorus Lewis Base compound in an amount of from 0.01 up to 0.5 molar proportions of the said Lewis Base compound for each molar proportion of the solid halide or oxyhalide of the transition metal;
   2. at least one organo-metallic compound of aluminum or of a non-transition metal of Groups IA or IIA wherein for each molecular proportion of the transition metal halide or oxyhalide which is present in component (1), there is present from 0.05 up to 20 molecular proportions of component (2); and
   3. a substituted or unsubstituted polyene in an amount of from 0.01 up to 1.0 moles of the polyene for each mole of component (2).

2. The catalyst of claim 1 wherein the transition metal compound is titanium trichloride, the organo-metallic compound is an aluminium trihydrocarbyl or a dihydrocarbyl aluminium halide or hydride, and the polyene is cyclooctatriene, cyclooctatetraene, cycloheptatriene or an alkyl or alkoxy substituted derivative thereof.

3. The catalyst of claim 2 wherein the Lewis Base compound which is component (4) is an organo-phosphorus compound or an amine.

4. The catalyst of claim 1 wherein the organo-phosphorus Lewis Base compound is hexamethylphosphoric triamide, N,N,N',N',N''-pentamethyl-N''-β-dimethylamino-ethylphosphoric triamide; 2-dimethylamino-1,3-dimethyl-1,3-diaza-2-phospholidine-2-oxide or octamethylpyrophosphoramide.

5. The catalyst of claim 3 wherein the Lewis Base compound is hexamethylphosphoric triamide, N,N,N',N',N''-pentamethyl-N''-β-dimethylamino-ethylphosphoric triamide; 2-dimethylamino-1,3-diethyl-1,3-diaza-2-phospholidine-2-oxide or octamethylpyrophosphoramide and the amine is N,N,N',N'-tetramethylethylenediamine.

6. The catalyst of claim 1 wherein from 0.05 up to 0.33 molar proportions of the organo-phosphorus Lewis Base compound are ground with each molar proportion of the solid halide or oxyhalide of the transition metal.

7. The catalyst of claim 1 wherein for each molecular proportion of the transition metal halide or oxyhalide which is present in component (1), there is present from 1 to 20 molecular proportions of component (2).

8. The catalyst of claim 1 wherein the number of moles of the polyene is from 0.05 up to 0.5 for each mole of component (2).

9. The catalyst of claim 2 wherein for each molecular proportion of the transition metal halide or oxyhalide present in component 1), there is present from 0.1 up to 4 molecular proportions of the Lewis Base compound which is component (4) and the amount of component (4) is less than the amount of component (2).

10. In a process for the production of an olefin polymer which comprises contacting at least one mono-α-olefin with a Ziegler polymerization catalyst, the improvement which comprises using, as the polymerization catalyst, the catalyst of claim 1.

11. A process according to claim 10 wherein the monomers, and any diluent, are of commercial purity and have been subjected to a further purification procedure.

12. The process of claim 10 comprising effecting polymerization in the absence of an inert diluent.

13. The catalyst of claim 1 which also includes a fourth component which is a Lewis Base compound which has not been ground with the transition metal halide or oxyhalide, wherein for each molecular proportion of the transition metal halide or oxyhalide present in component (1), there is present from 0.01 up to 10 molecular proportions of the Lewis Base compound which is component (4) and the amount of component (4) is less than the amount of component (2).

14. A process for the production of an olefin polymerization catalyst which comprises grinding a solid halide or oxyhalide of a transition metal of Groups IVA to VIA of the Periodic Table with from 0.01 up to 0.5 molar proportions of an organo-phosphorus Lewis Base compound for each molar proportion of the solid halide or oxyhalide of the transition metal, and mixing the ground product (1) with (2) from 0.05 up to 20 molar proportions of at least one organo-metallic compound of aluminum or of a non-transition metal of Groups IA or IIA for each molecular proportion of the transition metal halide or oxyhalide which is present in components (1) and (3) from 0.01 up to 1.0 moles of substituted or unsubstituted polyene for each mole of component (2).

15. A process according to claim 14 which comprises also mixing the ground product (1) with (4) from 0.01 up to 10 molecular proportions of a Lewis Base compound for each molecular proportion of the transition metal halide or oxyhalide present in component (1), the mixing of the ground product (1) and the Lewis Base compound (4) being effected in the presence of the organo-metallic compound (2), the amount of component (4) being less than the amount of component (2).

16. The catalyst of claim 13 wherein the fourth component is a Lewis Base compound which is the same as the Lewis Base compound which has been ground with the halide or oxyhalide of the transition metal.

* * * * *

UNITED STATES PATENT OFFICE
CERTIFICATE OF CORRECTION

Patent No. 3,990,994                    Dated November 9, 1976

Inventor(s) George David Appleyard, Ian Gabriel Williams

It is certified that error appears in the above-identified patent and that said Letters Patent are hereby corrected as shown below:

Claim 3, line 1, delete "2" and substitute --13--.

Claim 9, line 1, delete "2" and substitute --13--.

Signed and Sealed this sixteenth Day of August 1977

[SEAL]

Attest:

RUTH C. MASON
Attesting Officer

C. MARSHALL DANN
Commissioner of Patents and Trademarks